United States Patent
She et al.

(10) Patent No.: US 8,667,055 B2
(45) Date of Patent: Mar. 4, 2014

(54) METHOD FOR ACHIEVING AN ON-LINE MUTUAL INTERLOCUTION OPERATION

(75) Inventors: Kun She, Shenzhen (CN); Ming Feng, Shenzhen (CN); Li Zhang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 199 days.

(21) Appl. No.: 12/998,796

(22) PCT Filed: Dec. 11, 2008

(86) PCT No.: PCT/CN2008/073459
§ 371 (c)(1),
(2), (4) Date: Jun. 1, 2011

(87) PCT Pub. No.: WO2010/066078
PCT Pub. Date: Jun. 17, 2010

(65) Prior Publication Data
US 2011/0238739 A1 Sep. 29, 2011

(51) Int. Cl.
*G06F 15/16* (2006.01)

(52) U.S. Cl.
USPC .......................................... 709/203; 709/201

(58) Field of Classification Search
USPC ................................. 709/201, 203
See application file for complete search history.

(56) References Cited

U.S. PATENT DOCUMENTS

2006/0194185 A1* 8/2006 Goldberg et al. ............. 434/350
2009/0019060 A1* 1/2009 Beckerman et al. ............ 707/10

FOREIGN PATENT DOCUMENTS

| CN | 1489080 A | 4/2004 |
| CN | 1609867 A | 4/2005 |
| CN | 101030284 | 9/2007 |
| CN | 101221583 | 7/2008 |

OTHER PUBLICATIONS

Zhangnan, Zhang Hua "Open Sharing of Information Resources in the Grid Environment System" Southwest University for Nationalities (Humanities and Social Science Edition) Dec. 2007. 3 Pages.

* cited by examiner

*Primary Examiner* — Wing F Chan
*Assistant Examiner* — Andrew Woo
(74) *Attorney, Agent, or Firm* — Farjami & Farjami LLP

(57) ABSTRACT

A method for implementing an online mutual aid question-answer service comprises: a questioning user uploading an edited question to an extensible markup language document management (XDM) server; an answering user subscribing for a question from the XDM server, the XDM server sending the question subscribed for to the answering user; and after the answering user receives the question, the answering user answering the question, and informing the questioning user of the question about an answer of the question.

6 Claims, 4 Drawing Sheets

METHOD FOR ACHIEVING AN ON-LINE MUTUAL INTERLOCUTION OPERATION

This is a U.S. national phase application which is based on, and claims priority from, PCT application Serial No. PCT/CN2008/073459, filed Dec. 11, 2008.

TECHNICAL FIELD

The present invention relates to the wireless communication technology field, and particularly, to a method and a system for implementing online mutual aid question-answer services.

BACKGROUND OF THE RELATED ART

The internet likes an ever-expanding knowledge base, and people may find answers in the internet. However, currently, there is lack of satisfied means for users to conveniently access static information stored in thousands of servers. Certainly, search engines can be used for querying information, but users have to express their questions in a machine apprehensible way, for example a question is divided into a logic combination of a plurality of keywords. However, it is difficult to accurately describe the information to be obtained, and it is hard for users to obtain the most desired results.

Compared with the internet-linked machines, millions of human brains communicating through the internet can better satisfy users' knowledge seeking demands. Human brains can comprehend natural languages without any difficulty, and what's more the scale of a knowledge base comprised by the experiences and memories of millions of human beings is beyond measure. That is the reason why the mutual aid question-answer services on the internet are generally popular. People can ask to anyone on the other end of the internet for any questions about medical, science, entertainment, emotion, and so on, and they can usually obtain pointed answers.

However, the existing online mutual aid question-answer system has many shortcomings at present. Firstly, the user who can answer the question is not online all the time so that questions are difficult to answer in time; secondly, questioning user and answering user need to browse a certain web page from time to time to know whether a question is answered, or whether there is a question to be answered; moreover, answering user can only use a finite number of ways to express their answers, such as words or pictures, and can not communicate directly.

CONTENT OF THE INVENTION

The technical problem to be solved by the present invention is to provide a method and a system for implementing an online mutual aid question-answer service to accomplish answering of a question in time and in convenience.

To solve the above technical problem, the method for implementing an online mutual aid question-answer service according to the present invention comprises:

a questioning user uploading an edited question to an extensible markup language document management (XDM) server;

an answering user subscribing for a question from the XDM server, the XDM server sending the question subscribed for by the answering user to the answering user; and after receiving the question, the answering user answering the question, and informing the questioning user of the question about an answer of the problem.

Furthermore, the question uploaded to the XDM server by the questioning user includes a field to which the question belongs; the answering user subscribes for questions of one or more fields from the XDM server, and the XDM server sends the questions of the fields subscribed for by the answering user to the answering user.

Furthermore, after answering the question, the answering user uploads the answer of the question to the XDM server; and the XDM server sends down a received answer of the question to the questioning user of the question through an answer notification.

Furthermore, after uploading the edited question to the XDM server, the questioning user further chooses a frequency for sending the answer notification and the number of answers included in each answer notification, and uploads the frequency and the number to the XDM server; and the XDM server sends down the answer notification to the questioning user according to the frequency for sending the answer notification chosen by the questioning user and the number of answers included in each answer notification.

Furthermore, after the answering user answers the question, the answering user obtains presence information of the questioning user of the question, chooses a synchronous communication mode available to the questioning user of the question according to the presence information, and sends a communication request; and the questioning user of the question receives the communication request, and communicates with the answering user after choosing to accept the communication request to accomplish answering of the question.

Furthermore, the answering user obtains the presence information of the questioning user of the question in the following way:

the answering user sending a presence information subscription request to a question-answer service server;

after receiving the presence information subscription request, the question-answer service server sending down a presence information request to a presence server; and after receiving the presence information request, the presence server sending down the presence information of the questioning user of the question to the answering user.

Furthermore, the question uploaded to the XDM server by the questioning user including a rewarded score of the question; after the questioning user of the question receives the answer of the question, the questioning user of the question sending a questioning ending request to the XDM server if determining that the question has been solved;

after receiving the questioning ending request, the XDM server sending a question ending notification to a question-answer service server, wherein the question ending notification carries a user ID of the questioning user of the question, a user ID of the answering user and the rewarded score;

after receiving the question ending notification, the question-answer service server deducting the rewarded score from an account of the questioning user, and accumulating the rewarded score to an account of the answering user.

Furthermore, a system for implementing an online mutual aid question-answer service comprises: a questioning user, an answering user and a XDM server; wherein the questioning user uploads an edited question to the XDM server;

the answering user subscribes for a question from the XDM server, answers the question after receiving the question, and informs the questioning user about an answer of the question;

the XDM server is used for receiving the edited question of the questioning user, receiving the question subscription of the answering user, and sending the question subscribed for by the answering user to the answering user.

Furthermore, when informing the questioning user about the answer of the question, the answering user uploads the answer of the question to the XDM server;

the XDM server sends down a received answer of the question sent by the answering user to the questioning user of the question.

Furthermore, when informing the questioning user about the answer of the question, the answering user obtains presence information of the questioning user of the question, chooses a synchronous communication mode available to the questioning user of the question according to the presence information, and sends a communication request;

the questioning user of the question receives the communication request, and communicates with the answering user after choosing to accept the communication request to accomplish answering of the question.

The present invention implements the online mutual aid question-answer service through the IMS (IP Multimedia Subsystem), which has the following beneficial effects:

1. because the IMS is irrelative to access, users can use various terminals, such as personal computer, mobile phone, and PDA (Personal Digital Assistant) etc., to apply the mutual aid question-answer service through various IP access mode, such as ADSL (Asymmetric Digital Subscriber Line), WLAN (Wireless Local Area Network) and GPRS (General Packet Radio Service) etc., and keep online for a long time, thereby greatly increasing the scale of online user group, quickening the speed of answering a question.

2. compared with a mutual aid question-answer website, the present invention classifies the posed questions according to the fields to which the questions belong, and the answering user only subscribes for the questions of interested field. Questions will be sent down to subscribing answering user actively, and the answering user does not need to search questions. Similarly, once a question has an answer, it will be sent down to the questioning user automatically.

3. the questioning user and the answering user can also communicate in voice, white board and video sharing manners; moreover, charging for questioning and rewarding the answering user scores are performed to pay for questioning or other services so as to attract more users and promote the development of the service.

PREFERRED EMBODIMENTS OF THE PRESENT INVENTION

The IMS is a standard internet protocol-based and access-irrelative service publishing platform base on the third generation wireless communication technology (3G). The IMS successfully integrates two big communication networks of the internet and the mobile communication network. The IMS supports a plurality of terminals to access the internet, which makes the number of online users to increase enormously, and meanwhile, the IMS supports a plurality of communication modes, such as voice, words, video, short message, instant message, email, and so on. Therefore, the present invention implements online mutual aid question-answer services through the IMS based on the features of the IMS and the mutual aid question-answer services.

Figure 1:
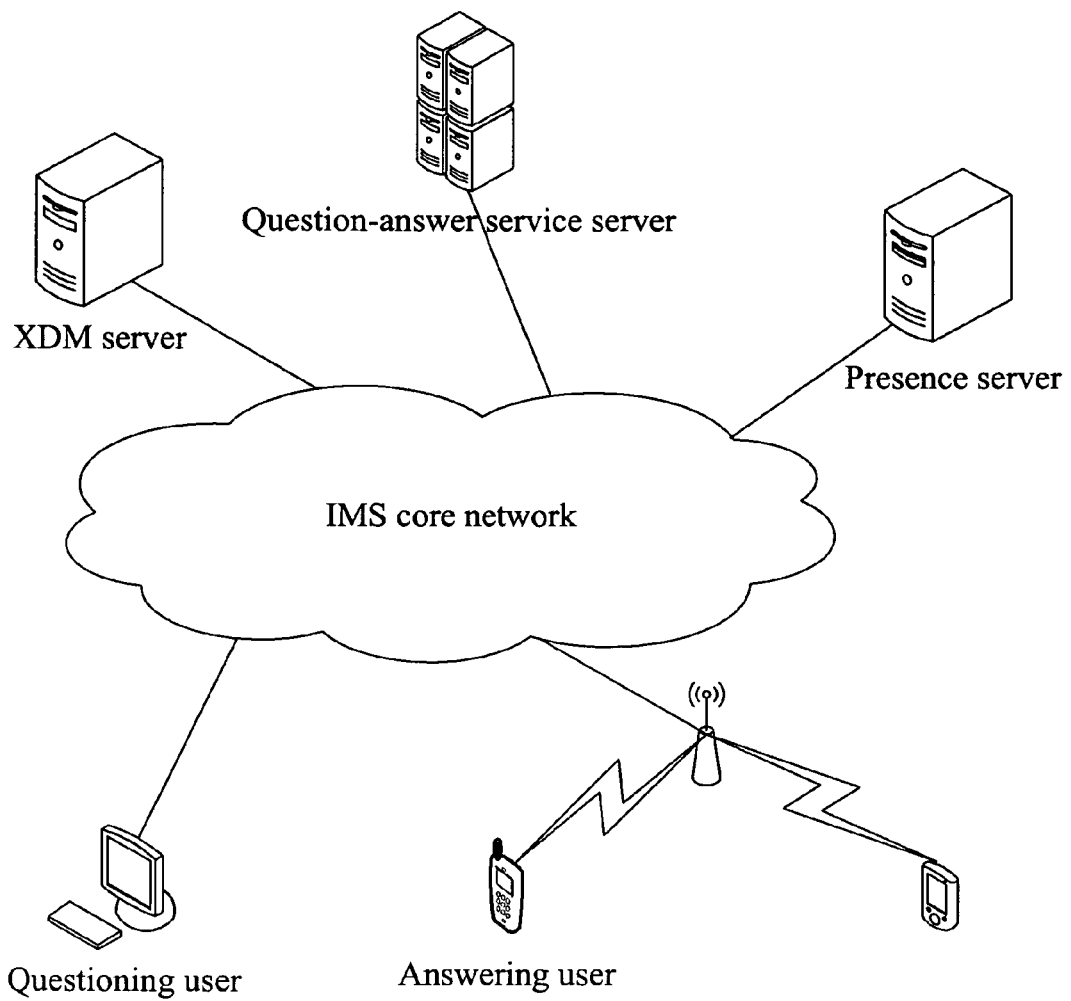
FIG. 1 is a frame diagram of the system for implementing online mutual aid question-answer services of the present invention.

The embodiments of the present invention are described in conjunction with the accompanying drawings below:

FIG. 1 is a system for implementing the online mutual aid question-answer service of the present invention, including: a questioning user, an answering user, an IMS core network, a XDM server, a presence server and a question-answer service server; wherein the questioning user uploads edited questions to the XDM server; receives a communication request sent by the answering user, and if choosing to accept the communication request, then the questioning user communicates with the answering user to accomplish solutions of the questions.

The answering user subscribes for questions from the XDM server, and after receiving the questions, the answering user answers the questions and informs the questioning user of the answers of the questions; the answering user can uploads answers of the questions to the XDM server which sends the answers of the questions to the questioning user of the questions; or the answering user can also obtain presence information of the questioning user of the questions, and chooses a synchronous communication mode available to the questioning user of the questions according to the presence information, and sends a communication request, if the questioning user accepts the communication request, then the questioning user communicates with the answering user to accomplish solutions of the questions.

The XDM server is used for receiving the questions edited by the questioning user, receiving the question subscriptions of the answering user, and sending the questions subscribed for by the answering user to this answering user; and sending down solutions of the questions sent by the answering user to the questioning user of the questions.

The IMS core network is responsible for terminal registration and signaling routing.

The presence server is used for recording the presence information of the questioning user, and providing the presence information for the answering user.

The question-answer service server is used for storing users' information, and controlling the logic of the whole service.

Before using the mutual aid question-answer service, users have to open this service, and when the service is opened, a global unique user ID is allocated to this user. In the mutual aid question-answer service, user IDs are used to identify different users, and all user IDs of the users who have opened the mutual aid question-answer service are known to one and another. Besides, each user ID corresponds to one User Identifier (URI), and the User Identifier is also called Public User Identifier (PUI). The User Identifiers of mutual aid question-answer services can be denoted in the format of tel:<user ID>, or can also be denoted in the format of sip:<user ID>@<operator domain name>, and users can communicate with each other through User Identifiers.

Besides, when opening the service, the presence server has to store the presence information of the questioning user, and the presence information includes: whether the questioning user allows synchronous communication with the answering user, if yes, the presence server records the allowable synchronous communication modes, such as the instant message, VoIP (Voice over Internet), video sharing, white board, and so on. The presence server also records the offline, online states of the questioning users at any moment, and writes them into the presence information of the questioning users to update the presence information at any moment.

Figure 2:
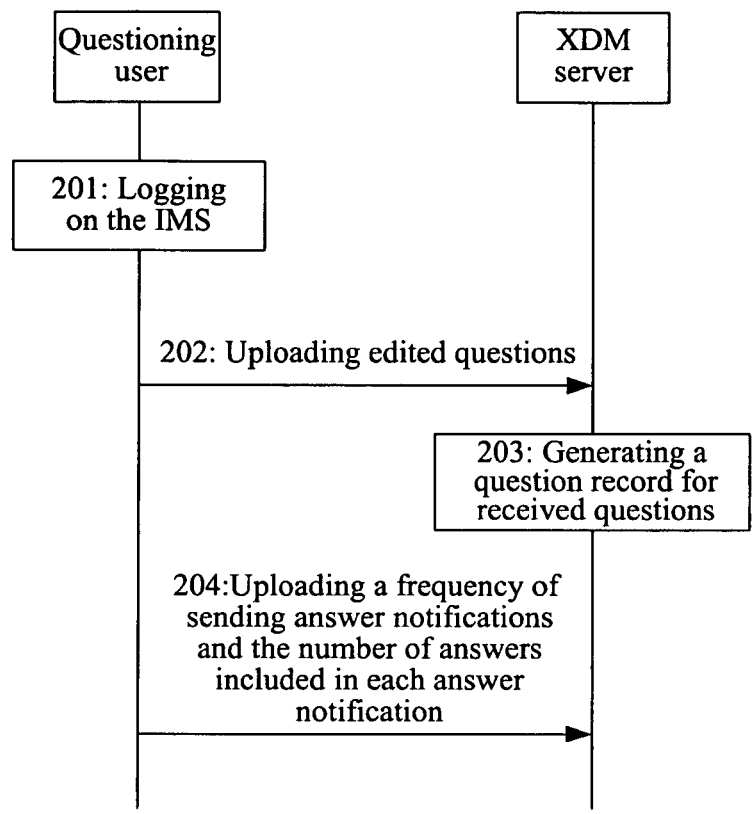
FIG. 2 is a flow chart of originating a question by a questioning user in the method of the present invention.

FIG. 2 shows a method for uploading a question by a questioning user using a mutual aid question-answer service according to the present invention, and the method comprises:

step S201: the questioning user using a User Identifier to log on the IMS;

step S202: the questioning user editing a question, wherein the question includes: a title of the question, content of the question, a field to which the question belongs, and a rewarded score, and uploading the question and the user ID thereof to a XDM (XML Document Management, where XML is an abbreviation of Extensible Markup Language) server;

step S203: after the XDM server receives the question sent by the questioning user, the XDM server generating a question record for this question, wherein the question record includes: the title of the question, the user ID of the questioning user, the content of the question, the field to which the question belongs, the rewarded score and a question ID generated uniquely for this question;

step S204: after the question is uploaded successfully, the questioning user choosing a frequency of sending answer notifications and the number of answers included in each answer notification, and uploading the frequency and the number to the XDM server.

That the questioning user configures the frequency of sending the answer notifications by the XDM server and the number of the answers included in each answer notification can prevent the answer notifications from being too centralized to be dealt with by terminals.

The questioning user can also inform the XDM server of not sending answers of the question until the number of the answers achieves a specified number, for example, the XDM server sends the answers to the questioning user every time when receiving 5 answers.

The XDM server defaults that the questioning user subscribes for all the answers about the questions uploaded by it.

Figure 3:
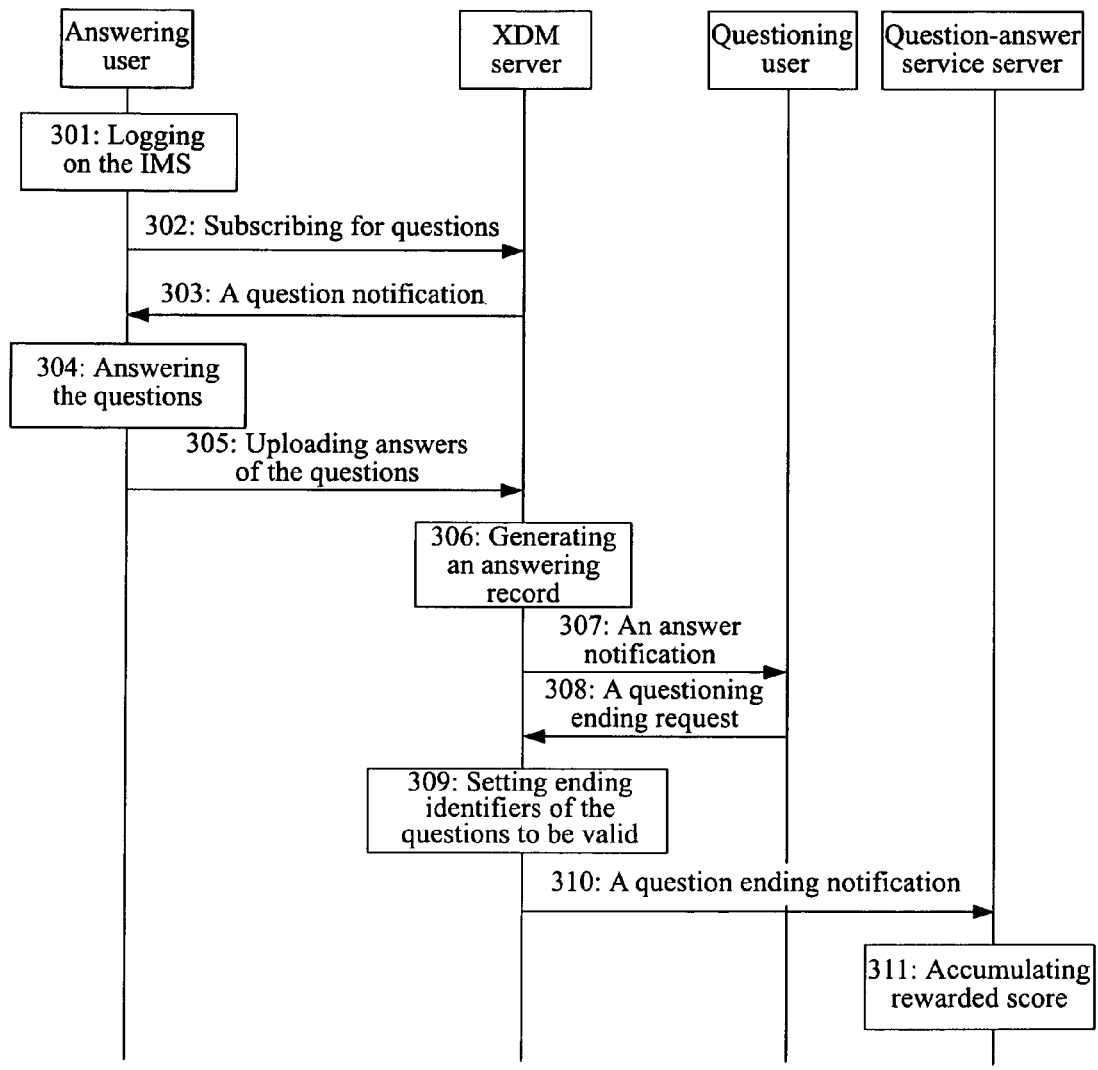
FIG. 3 is a flow chart of answering a question in the method of the present invention.

FIG. 3 shows a method for answering questions by an answering user using a mutual aid question service, and the method comprises:

step S301: an answering user using its User Identifier to log on the IMS;

step S302: the answering user subscribing for questions of interested fields, setting a frequency for sending question notifications and the number of questions included in each question notification, and informing the XDM server;

That the answering user sets a frequency for sending the question notifications and the number of questions included in each question notification can prevent the question notifications from being too centralized to be dealt with by terminals.

The answering user can also inform the XDM server of not sending questions until the number of the questions of the chosen fields achieves a specified number, for example, the XDM server sends the answers to the answering user every time when receiving 5 questions.

step S303: the XDM server sending question notifications to the answering user to inform the answering user of the questions of the fields subscribed for by the answering user, where the question notifications carry question records of the questions;

The question notifications are sent in the question notification frequency set by the answering user.

Above question notifications may also be a brief information list, for example, only titles of the questions and the user ID of the questioning user are included, and the answering user can choose one item to download and scan its detail information.

step S304: after receiving the question notifications sent by the XDM server, the answering user browsing the received questions and answering the questions;

If the question notifications are in a format of information list, the answering user can further download the detailed content etc. of the questions from the XDM server by use of the question ID.

step S305: the answering user sending solutions to the XDM server, wherein the solutions include: answers of the questions, question IDs and user ID of the answering user itself;

step S306: after the XDM server receives the solutions, generating answer records for the questions according to the question IDs, wherein the answer records include the user ID of the answering user and the answers of the questions;

step S307: the XDM server sending answer notifications to the questioning user, wherein the answer notifications include titles of the questions, the question IDs, answers of the questions, and the user ID of the answering user;

The answer notifications are sent in the notification frequency set by the questioning user.

The answer notifications may be a brief information list, for example, only the titles of the questions and the user ID of the answering user are included, and the questioning user can choose a certain item to download and scan its detailed information.

step S308: after the questioning user receives the answer notifications, if determining the questions have been solved, then the questioning user sending a questioning ending request to the XDM server, wherein this questioning ending request includes the questions ID and user ID of an answering user who provides the best answer;

step S309: after receiving the questioning ending request, the XDM server setting ending symbols of the questions to be valid according to the question IDs, which denotes that the questions have been solved;

step S310: the XDM server sending a question ending notification to the question-answering service server to inform the question-answering service server that the questions are closed, wherein the question ending notification includes the user ID of the questioning user, the user ID of the answering user and the rewarded score;

step S311: after receiving the question ending notification, the question-answer service server deducting the rewarded score from the account of the questioning user, and accumulating to the account of the answering user.

Figure 4:
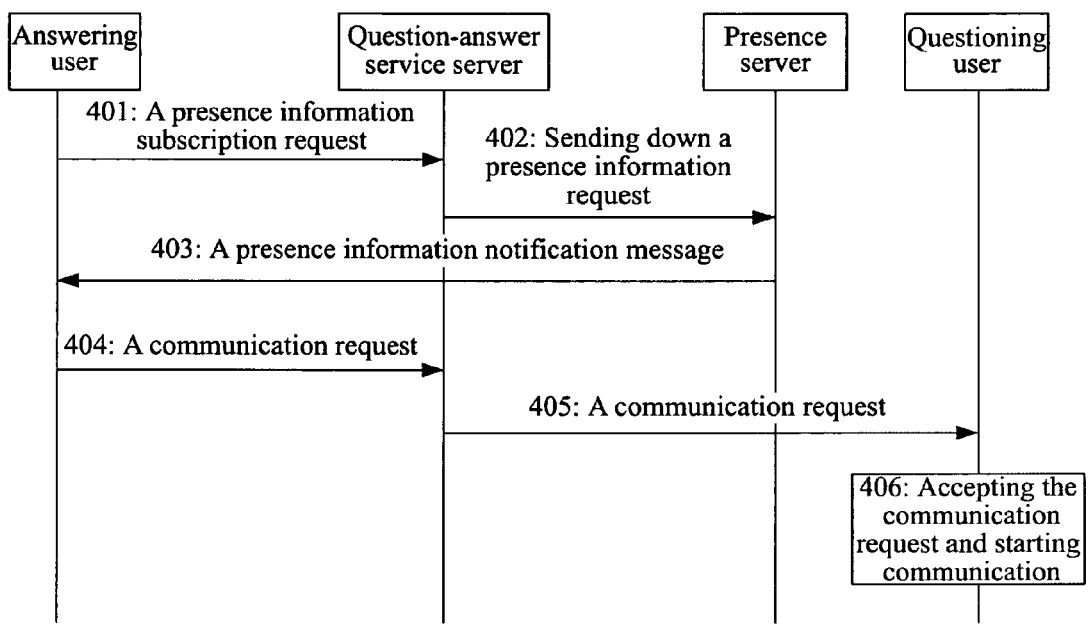
FIG. 4 is a flow chart of a questioning user and an answering user using a synchronous communication mode to accomplish answering of a question in the method of the present invention.

As shown in FIG. 4, the questioning user and the answering user may also perform questioning and answering in a synchronous communication mode, which comprises:

step S401: after an answering user browsing a question, if thinking that synchronous communication with the questioning answer is necessary, then the answering user sending a presence information subscription request to a question-answer service server, wherein this presence information subscription request carries the user ID of the questioning user and the user ID of the answering user;

step S402: the question-answer service server inquiring the privacy protection setting of the questioning user according to the user ID of the questioning user, if the questioning user allows to make public presence information, then the question-answer service server sending down a presence information request to the presence server, where the presence information request carries the user ID of the questioning user and the user ID of the answering user;

The questioning user may choose a privacy protection setting when opening the service, or change the privacy protection setting by sending a changing message to the question-answer service server.

step S403: after the presence server receives a presence information sending down request, the presence server searching the presence information of the questioning user according to the user ID of the questioning user, and sending a presence information notification message to the answering user according to the user ID of the answering user to send the searched presence information of the questioning user to the answering user;

step S404: the answering user determining whether the questioning user allows synchronous communication according to the presence information, if it allows, then the answering user choosing one allowable synchronous communication mode of the questioning user, and sending a communication request to the questioning user by use of the public user identifier of the questioning user;

The answering user can obtain the pubic user identifier of the questioning user according to its user ID. The pubic user identifier of the questioning user may be tel:<the user ID of the questioning user> or sip:<the user ID of the questioning user>@<operator's domain name>.

The synchronous communication modes include: voice, instant message, VoIP, white board, video sharing, and so on.

step S405: the communication request being routed to the question-answer service server through the IMS core network, and the question-answer service server sending down the communication request to the questioning user;

step S406: the questioning user accepting the communication request, and communicating with the answering user to accomplish answering of the questions.

The above description is only the preferred embodiments of the present invention, which is not used for limiting the present invention. It is understood for the skilled in the art that various modifications and variations may be made on the present invention. Any modifications, equal substitutions and improvements without deviating from the spirit and principle of the invention are all covered by the protection scope of the present invention.

What we claim is:

1. A method for implementing an online mutual aid question-answer service, the method comprising:
   a questioning user device uploading a question to an extensible markup language document management (XDM) server;
   after uploading the question to said XDM server, said questioning user device further choosing a frequency for sending an answer notification and a number of answers included in each answer notification, and uploading the frequency and the number to said XDM server;
   an answering user device subscribing for questions from said XDM server, said XDM server sending the question to said answering user device;
   after said answering user device receives the question, said answering user device answering the question, and informing said questioning user device about an answer to the question;
   after answering said question, said answering user device uploads the answer to the question to said XDM server, said XDM server sends down the answer to the question to said questioning user device through the answer notification;
   said XDM server sending down said answer notification to said questioning user device according to the frequency for sending said answer notification chosen by the questioning user device and the number of answers included in each answer notification;
   after said answering user device answers the question, said answering user device obtaining presence information of the questioning user device, choosing a synchronous communication mode available to the questioning user device according to said presence information, and sending a communication request with the synchronous communication mode; and
   the questioning user device receiving said communication request, and communicating with said answering user device after choosing to accept the communication request to receive the answer to said question.

2. The method as claimed in claim 1, wherein
   said question uploaded to said XDM server by said questioning user device includes a field to which the question belongs, said answering user device subscribes for the questions of one or more fields from said XDM server, and said XDM server sends the questions of the one or more fields subscribed for by the answering user device to said answering user device.

3. The method as claimed in claim 1, wherein said answering user device obtains the presence information of the questioning user device of said question in the following way:
   said answering user device sending a presence information subscription request to a question-answer service server;
   after said question-answer service server receives said presence information subscription request, said question-answer service server sending down a presence information request to a presence server; and
   after said presence server receives said presence information request, said presence server sending down the presence information of the questioning user device of said question to said answering user device.

4. The method as claimed in claim 1, further comprising:
   said question uploaded to said XDM server by said questioning user device including a rewarded score of the question, after the questioning user device of said question receives the answer of said question, the questioning user device of the question sending a questioning ending request to said XDM server if determining that the question has been solved;
   after receiving the questioning ending request, the XDM server sending a question ending notification to a question-answer service server, wherein the question ending notification carries a user ID of the questioning user device of said question, a user ID of said answering user device and said rewarded score;
   after receiving said question ending notification, the question-answer service server deducting the rewarded score from an account of said questioning user device, and accumulating the rewarded score to an account of said answering user device.

5. A system for implementing an online mutual aid question-answer service, including: a questioning user device, an answering user device and a XDM server; wherein:
   said questioning user device uploads a question to said XDM server, wherein after uploading the question to said XDM server, said questioning user device further chooses a frequency for sending an answer notification and a number of answers included in each answer notification, and uploading the frequency and the number to said XDM server;

said answering user device subscribes for questions from said XDM server, answers the question after receiving the question, and informs the questioning user device about an answer to said question;

said XDM server is used for receiving the question of said questioning user device, receiving the question for said answering user device, and sending the question to the answering user device;

when said answering user device informs said questioning user device about the answer to the question, after answering said question, said answering user device uploads the answer to the question to said XDM server;

said XDM server sends down the answer to the question to said questioning user device through the answer notification, wherein said XDM server sends down said answer notification to said questioning user device according to the frequency for sending said answer notification chosen by the questioning user device and the number of answers included in each answer notification;

said answering user device obtains presence information of the questioning user, chooses a synchronous communication mode available to the questioning user of said question according to the presence information, and sends a communication request;

the questioning user device receives said communication request, and communicates with said answering user device after choosing to accept the communication request to receive the answer to said question.

6. The system as claimed in claim 5, wherein when said answering user device informs said questioning user device about the answer to said question, said answering user device uploads the answer to said XDM server;

said XDM server sends down a received answer of said question sent by said answering user to the questioning user device of said question.

\* \* \* \* \*